United States Patent [19]
Ashton

[11] Patent Number: 5,057,175
[45] Date of Patent: Oct. 15, 1991

[54] METHOD AND APPARATUS FOR MAKING CONTINUOUS LENGTHS OF THERMOPLASTIC FIBER REINFORCED LAMINATES

[75] Inventor: John W. Ashton, Leominster, England

[73] Assignee: H.R. Smith (Technical Developments, Ltd.), Oxfordshire, England

[21] Appl. No.: 352,331

[22] Filed: May 16, 1989

Related U.S. Application Data

[63] Continuation-in-part of Ser. No. 54,427, May 22, 1987, abandoned, which is a continuation-in-part of Ser. No. 100,449, Jul. 30, 1986, abandoned.

[30] Foreign Application Priority Data

Jul. 31, 1985 [GB] United Kingdom ............... 8519297
Jul. 30, 1986 [WO] PCT Int'l Appl. ...... PCT/GB/00449

[51] Int. Cl.[5] .................. B32B 31/08; B32B 31/20
[52] U.S. Cl. .................................. 156/202; 156/245; 156/289; 156/311; 156/324; 156/461; 156/468; 156/581; 156/583.5
[58] Field of Search ............... 156/62.2, 62.8, 202, 156/247, 289, 324, 245, 461, 581, 583.5, 324, 311, 468; 100/98 RP; 264/70, 257, 258; 427/206

[56] References Cited

U.S. PATENT DOCUMENTS

| | | | |
|---|---|---|---|
| 3,383,266 | 5/1968 | Helm | 156/324 |
| 3,532,570 | 10/1970 | Cotter | 156/324 |
| 3,671,355 | 6/1972 | Paymal | 156/324 |
| 4,396,566 | 8/1983 | Brinkmann | 264/70 |
| 4,420,509 | 12/1983 | Barrell | 427/206 |
| 4,573,404 | 3/1986 | Held | 156/583.5 |

FOREIGN PATENT DOCUMENTS

| | | |
|---|---|---|
| 316116 | 6/1974 | Austria . |
| 52664 | 6/1982 | European Pat. Off. . |
| 708342 | 5/1954 | United Kingdom . |
| 745628 | 2/1956 | United Kingdom . |
| 1057783 | 2/1967 | United Kingdom . |
| 2086444 | 5/1982 | United Kingdom . |

Primary Examiner—Michael W. Ball
Assistant Examiner—Michele K. Yoder
Attorney, Agent, or Firm—Helfgott & Karas

[57] ABSTRACT

A method and apparatus for making continuous lengths of thermoplastics material fibers reinforced laminates by arranging layers of fibers reinforcement impregnated with a thermoplastics material in alignment with and between outer sheets of another material to form a stack and passing the stack through a tool having two opposing platens, one of which is movable relative to the other, and operating the tool so as to compress the stack and form a laminate. The stack is passed from entry to exit of the tool in steps, the extent of each of which is substantially less than the length of the tool such that each area of the stack is subjected to repeated compressions by the tool is passing therethrough. A recess is formed in one platen, which is adapted to receive a land formed on the other platen. The platens are differentially heated and/or cooled such that the temperature of the high temperature thermoplastics material impregnating the fibers of the stack is first raised to at least the melt temperature of the thermoplastic material, maintained for a time at that temperature and is then allowed to fall below that temperature. The faces of the platens are profiled such that the spacing between the opposing faces decreases along at least part of the length of the recess.

21 Claims, 4 Drawing Sheets

METHOD AND APPARATUS FOR MAKING CONTINUOUS LENGTHS OF THERMOPLASTIC FIBER REINFORCED LAMINATES

CROSS-REFERENCE TO RELATED APPLICATION

The present application is a continuation-in-part of application Ser. No. 054,427 filed May 22, 1987 which in turn is a continuation-in-part of application Ser. No. 100,449 filed July 30, 1986, now abandoned.

BACKGROUND OF THE INVENTION

The invention concerns the production of laminates, in particular the continuous production of laminates from fibers reinforced high temperature thermoplastics materials.

Throughout this specification the term laminate is intended to encompass a structure formed by consolidating, by application of heat and pressure, one or more layers of fibers reinforced material impregnated with one or a mixture of thermoplastics materials to form a laminate of desired shape. The polymers may have fillers or other additives added to them to give desired strength and/or visual characteristics to the final laminate. The laminate may have additional outer (or inner) layers of other materials for decorative and/or functional purposes.

Throughout this specification the term high temperature thermoplastics material is intended to encompass thermoplastics materials having a processing temperature of 280° C. or above. Such thermoplastics materials include polysulphones, polyethersulphones, polyetheretherketones, polyetherimides and polyimides.

Throughout this specification the term glass transition temperature is intended to encompass both the glass transition temperatures of crystalline polymers and the heat distortion/softening temperatures of amorphous polymers.

The production of laminates from fiber reinforced low temperature thermoplastics materials (such as polypropylene) is well known and normally when making continuous lengths of them the heating and compression of the impregnated fibers reinforcement is effected by passing the impregnated fibers reinforcement through one or more pairs of heated compression rollers. In this way the polymer material is forced into the interstices of the fibers reinforcement, is cured and a laminate of the desired form produced. This has good results with the low temperature thermoplastics materials noted which can be processed at temperatures of up to 270° and pressures of 10–50 p.s.i.

A difficulty found with this technique for producing laminates is in controlling the consistency of the final product. It has been found that laminates produced by passing thermoplastics impregnated fibers reinforcement through compression rollers may be formed with "dry" areas—that is to say areas in which the polymer has not thoroughly wetted the fibers reinforcement. This problem appears to be particularly associated with the use of compression rollers and is exacerbated when attempting to use the technique with high temperature thermoplastics materials. Attempts to overcome the difficulties have included another proposal for continuously forming laminates, which makes use of a compression tool having a pair of platens between which the thermoplastics material impregnated fibers reinforcement is passed in steps—the tool being operated between step movements of the impregnated fibers reinforcement to compress it and form the laminate.

This proposal partially overcomes the noted difficulty found with the use of compression rollers, however, the laminates produced (especially from high temperature thermoplastics materials) still include some areas which are "dry", and additional problems which arise are the misalignment of the fibers reinforcement and the formation of "voids" in the finished product. These problems can usually become overcome by correct adjustment and calibration of the equipment (e.g. temperature, pressure and cycle time) and by the proper design of the feed and guide parts of the apparatus.

Additionally, it has been suggested that the impregnated fibers reinforcement be moved through the compression tool in small steps such that each area of the impregnated fibers reinforcement is subjected to multiple compressions within the tool.

This has had limited success in eliminating the visual imperfections in the final laminate and has done nothing for (or even exacerbated) another problem found when producing laminates, namely the sticking of the thermoplastics impregnant to the surfaces of the tool (compression rollers or platens) used, which leads to difficulty in controlling the pressure applied to the laminate within the tool and consistency of the final product.

To prevent this happening it has been suggested that the surfaces of the tool contacting the impregnated fibers reinforcement in the tool be coated with a release agent (e.g. P.T.F.E.) which acts to inhibit adhesion of the polymer in the impregnated fibers reinforcement to the surfaces of the tool.

However, even with this safeguard the polymer material can still adhere to the surfaces of the tool with the effect that the laminates produced are imperfect and with the result that the process must be stopped to allow the tool to be broken down, cleaned, re-coated with the release agent and reassembled to enable laminate production to continue. Such a procedure is expensive both in terms of labour and of lost laminate production.

These problems of processing high temperature thermoplastics materials are not, of course, met when making laminates in a closed mould—in the piece—in which circumstance the temperature of the workpiece and the pressure applied to the workpiece may be controlled as desired.

SUMMARY OF THE INVENTION

One object of this invention is the provision of a method of making thermoplastics material impregnated fibers reinforced laminates from high temperature thermoplastics materials which overcomes or at least alleviates the noted problems of the methods proposed to date.

In the production of certain articles there is need to coat a laminate with metal. For example, printed circuit boards are produced by coating a flat laminate with a conductive metal layer which is thereafter treated, e.g. photo etched, to produce the desired electrical interconnections on the face(s) of the laminate to which the active elements of the circuit are connected. The usual method of forming such a metal coated laminate is to take a formed laminate and then apply the metal coating to it (by depositing or simply sticking the metal layer onto the laminate). This process is time consuming and prone to difficulties in ensuring that the metal layer is of consistent thickness and/or adequately fixed onto the face(s) of the laminate.

Another object of this invention is the provision of a method for production of laminates coated with metal layers which overcomes the noted difficulties of the known processes.

In one aspect the invention provides a method of making continuous lengths of thermoplastics material fibers reinforced laminates by a process which includes the steps of arranging one or more layers of fibers reinforcement impregnated with a thermoplastics material in alignment with and between outer sheets of another material to form a stack and passing the stack through a tool having platens, at least one of which is movable relative to the other and operating the tool to compress the stack and form a laminate, the stack being passed from entry to exit of the tool in steps, the extent of each of which is substantially less than the length of the tool such that each area of the stack is subjected to repeated compressions by the tool in passing therethrough, wherein the thermoplastics material fibers reinforcement is a high temperature thermoplastics material, wherein in passing through the tool the stack is passed along a recess formed in one of said platens, which recess is shaped to receive a land formed on the other platen and the width of which is substantially the same as the width of the stack as the stack passes through the tool, wherein one or both platens of the tool are differentially heated and/or cooled such that the temperature of the high temperature thermoplastics material impregnating the fibers reinforcement of the stack in passing through the tool is first raised to at least the melt temperature of the high temperature thermoplastics material impregnating the fibers reinforcement and then allowed to fall below that temperature, and wherein the face of each said platen between which the stack is compressed in passing through the tool is profiled such that the spacing between those faces decreases along at least part of the length of the recess through which the stack travels from the entry to the exit of the tool.

The high temperature thermo material is preferably selected from the group consisting of polysulphone, polyethersulphone, polyetheretherketone, polyimide and polyetherimide.

Desirably the outer sheets are wider than each said layer of impregnated fibers reinforcement therebetween and the leading parts of the side walls of the recess at the entry of the tool to which the stack is passed are tapered such that the outer sheets are wrapped around the edges of said layers as the stack passes into the tool.

The stack of impregnated fibers reinforcement and the outer layers may be passed to the tool between a pair of metal guides arranged to taper toward the entry of the tool and, each of said pair being aligned with a respective one of the the leading part of the side walls of the recess at the entry of the tool.

The opposed faces of the platens between which the stack is compressed in passing through the tool are desirably profiled such that the spacing therebetween decreases at a first rate along at a first part of the length of the recess, at a second rate less than said first rate along at a second part of the length of the recess, and is substantially constant along the third part of the length of the recess.

Both platens are preferably heated and/or cooled such that the temperature of the thermoplastics material impregnating the fibers reinforcement of the stack in passing through the tool is raised to at least the melt temperature (Tm) thereof as the stack passes along the first part of the the length of the recess, is maintained at that temperature as the stack passes along the second part of the the length of the recess, and is allowed to fall below the glass transistion temperature (Tg) of said thermoplastics material as the stack passes along the third part of the length of the recess.

The stack of impregnated fibers reinforcement and the outer sheets may be passed to the tool between a pair of metal strips arranged in abutting relationship on each side edge of the stack. The outer sheets may be of metal.

The outer sheets may be removed from the laminate after passing through the tool.

The outer sheets may comprise endless stainless steel bands arranged to run through the tool in register with the polymer impregnated fiber reinforcement.

The surfaces of the outer sheets which contact the impregnated fibers reinforcement may be coated with a release agent before they are brought into contact with the impregnated fibers reinforcement.

Alternatively the outer sheets may be bonded to and form part of the laminate as the laminate is formed in the tool, in which case the surfaces of the outer sheets which contact the impregnated fibers reinforcement may be coated with a solution of the polymer impregnant for the fibers reinforcement before they are brought into contact with the impregnated fibers reinforcement.

In a second aspect the invention provides an apparatus for making continuous lengths of laminates from fibers in a matrix of a high temperature thermoplastics material selected from the group comprising polysulphone, polyethersulphone, polyetheretherketone, polyetherimide and polyimide, the apparatus including means for arranging one or more layers of fibers reinforcement impregnated with a thermoplastics material in alignment with and between outer sheets of another material to form a stack, means for passing the stack stepwise through a tool having a first platen which is stationary and a second platen movable relative to the first platen which tool is operable to compress the stack and form a laminate, wherein said second platen of the tool is formed with a recess the width of which is substantially the same as the width of the stack as the stack passes through the tool and which is shaped to receive a land formed on the said first platen, wherein the leading edges of the recess at the entry to the tool to which the stack is passed are tapered such that the said outer sheets are wrapped around the edges of said layers as the stack passes into the tool, wherein the opposed faces of said land of the first platen and the recess of the second platen are profiled such that the spacing therebetween decreases at a first rate along at a first part of the length of the recess, at a second rate less than said first rate along at a second part of the length of the recess, and is substantially constant along the third part of the the length of the recess, and wherein both platens include means enabling them to be are heated and/or cooled so that the temperature of the thermoplastics material impregnating the fibers reinforcement of the stack in passing through the tool may be raised to at least the melt temperature thereof as the stack passes along the first part of the the length of the recess, be maintained at temperature as the stack passes along the second part of the the length of the recess, and is allowed to fall below the glass transistion temperature of said thermoplastics material as the stack passes along the third part of the the length of the recess.

Embodiments of the invention will now be described with reference to the accompanying drawings.

DETAILED DESCRIPTION OF THE PREFERRED EMBODIMENTS

Figure 1A:
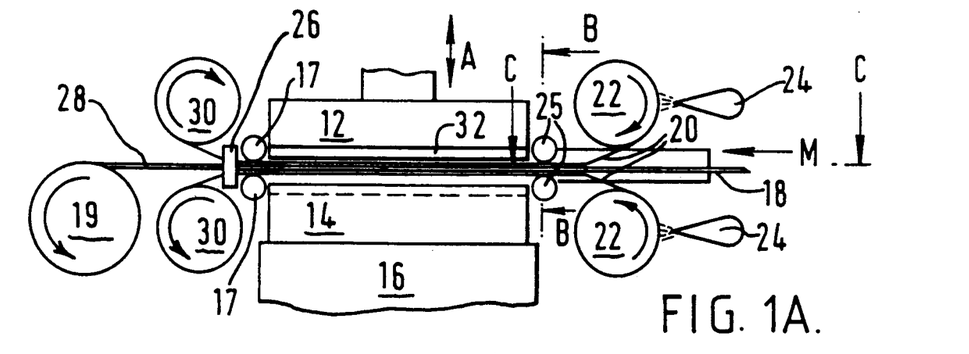
FIG. 1A, shows diagrammatically an arrangement for use in the method of the invention.

FIG. 1 shows an arrangement for use in one method of the invention and which will be described in the manufacture of a simple laminate, e.g. a laminate not having outer surfaces of a material different from the material forming the main body of the laminate. The arrangement includes a tool with upper and lower platens, 12 and 14 respectively. Platen 12 is movable relative to platen 14 (as indicated by arrow A), over a relatively short distance (typically 0.06"-1.5 mm in producing a laminate having a finished thickness of 0.04" or 1.00 mm) to compress impregnated fibers reinforcement fed to the tool. Platen 14 is carried on a fixed base 16.

One or more layers of fibers reinforcement 18 impregnated with a thermoplastics material is fed through the tool, in the direction of arrow M, in relatively small steps (e.g. as little as 0.10" or 2.5 mm) and is compressed by repeated operation of the tool. The impregnated fibers reinforcement comprises any suitable high thermoplastics material reinforced with fibers, e.g. polyethersulphone reinforced with glass or carbon fibers. The impregnated fibers reinforcement is drawn through the tool by means of hydraulically powered drive rollers 17 which pinch the laminate emerging from the tool and the laminate is wound onto a take-up roller 19 located at the end of the tool as shown.

Two metal outer sheets 20 which are slightly wider than the impregnated fibers reinforcement 18 are passed to the tool in register with the impregnated fiber reinforcement 18 as shown, one sheet lying above and the other beneath the the impregnated fiber reinforcement 18. The sheets 20 are taken from rollers 22 as shown and their center lines are aligned with the center line of the impregnated fibers reinforcement as they are carried into the tool.

Figure 1B:
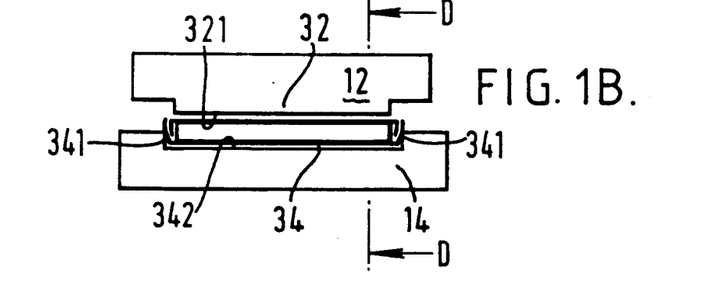
FIGS. 1B and 1C are views drawn on the, lines B—B and C—C of FIG. 1A, FIG. 2A, diagrammatically shows in more detail the platens of the tool shown in FIG. 1A

As can been seen particularly from FIG. 1B, the platens 12 and 14 are shaped such that the moving platen 12 has a raised center section or land 32 with a face 321 and which is received within a complementary shaped recess 34 of fixed platen 14. Recess 34 has side walls 341 and a bottom face 342 across which the stack of impregnated fibers reinforcement 18 and metal outer sheets 20 pass. When the tool is operated the stack of impregnated fibers reinforcement 18 and metal outer sheets 20 are repeatedly compressed between the face 321 of the land 32 and face 342 of recess 34 in passing through the tool.

Figure 1C:
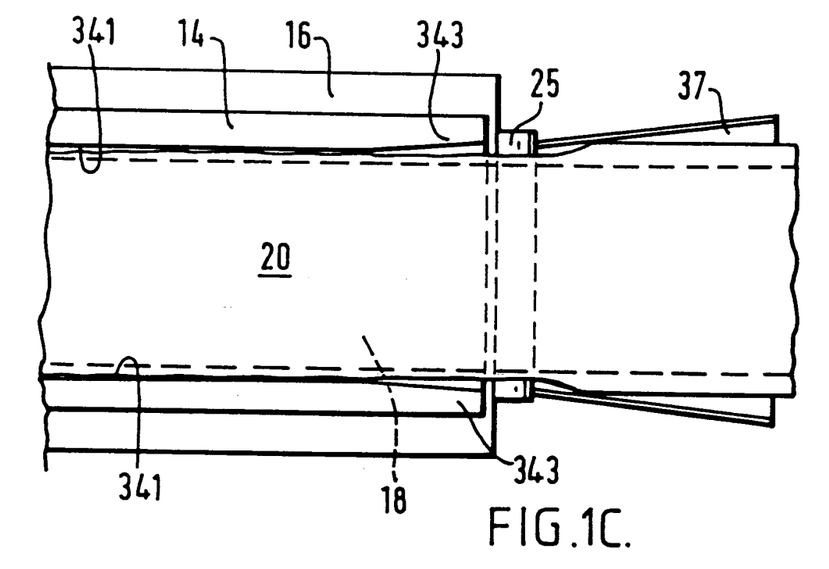

As can be more clearly seen from FIG. 1C, which is a plan view of that end of the tool to which the impregnated fibers reinforcement is fed, the width of each foil 20 as it is taken off associated roller 22 is greater than the width of the fibers reinforcement 18 and the recess 34. As the outer sheets 20 and the fibers reinforcement are carried to the tool they pass through a former-guide 37 of reducing width and having upstanding sides which contact the edges of the outer sheets 20 and folds them onto the edges of the impregnated fibers reinforcement 18.

It will further be noted from FIG. 1C that the leading parts 343 of the side walls 341 of the recess 34—to which the stack is first passed—are tapered to enhance this wrapping of the outer sheets 20 around the fibers reinforced with high temperature thermoplastics material layers between them.

Thus the outer sheets 20, in passing through the tool, surround and enclose the fibers reinforced high temperature thermoplastics layers between them.

Prior to their being aligned with the impregnated fibers reinforcement the surfaces of the sheets 20 which will contact the impregnated fibers reinforcement are coated with a suitable release agent (such as P.T.F.E.) from spray nozzles 24 as shown.

Immediately before the stack is passed to the tool it is preferably run between two pairs of pinch rollers 25 arranged to bear on the edges of it.

After the stack has passed through the drive rollers 17 the edges of the outermost edges of the laminate 28 which has been formed and of the sheets 20 are cut off by cutters 26 and the remaining parts of those sheets are stripped away from the laminate and wound onto hydraulically driven take-up rollers 30 as shown.

The operation of the drive rollers 17, the take-up rollers 19 and the take-up rollers 30 is controlled so that each step of the movement of the impregnated fibers reinforcement and sheets 20 through the tool is significantly smaller than the extent of the platens 12 and 14 in the direction of motion of the impregnated fibers reinforcement. Thus for a platen 12 which is 30" (0.75 m) long the typical length of each step by which the impregnated fibers reinforcement is moved would be 3" (7.5 cm) so that each area of the fibers reinforcement would be subjected to 10 separate compressions by the platen as it moves through the tool.

Figure 2A:
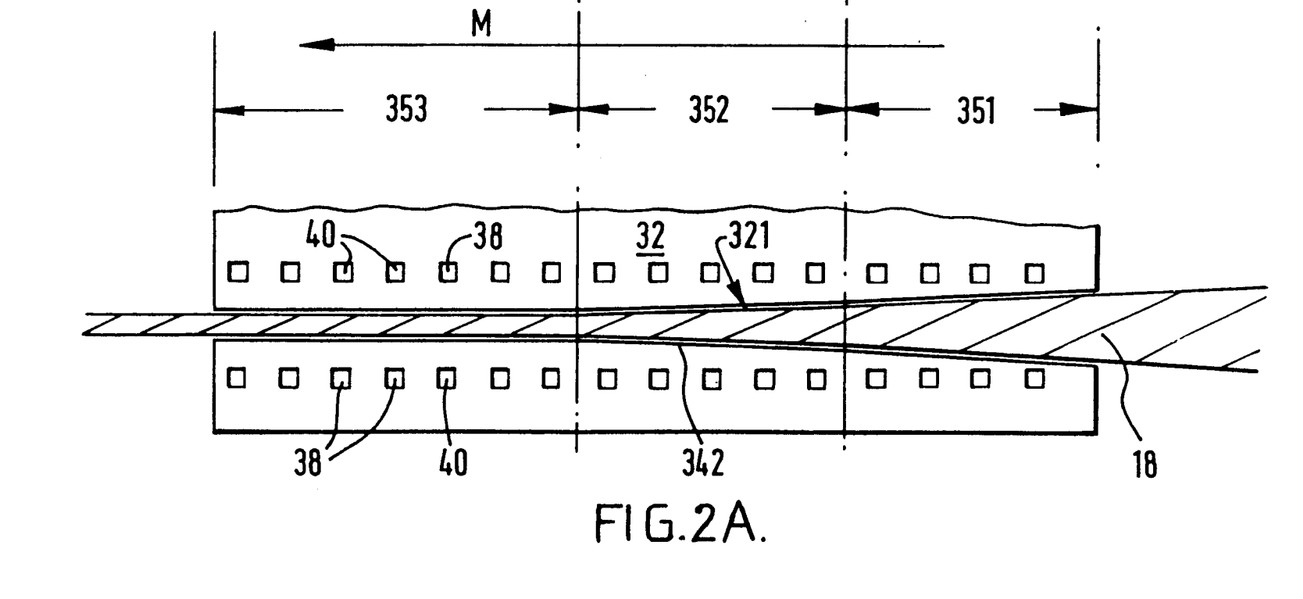

The platens 12 and 14 are shaped, as can be seen from FIG. 2, such that the opposed faces 321 and 342 of the land 32 and recess 34, between which the stack is compressed in passing through the tool, are profiled such that the spacing therebetween decreases at a first rate along at a first part 351 of the length of the recess, at a second rate less than said first rate along at a second part 352 of the length of the recess, and is substantially constant along the third, remaining part 353 of the length of the recess 34.

Figure 2B:
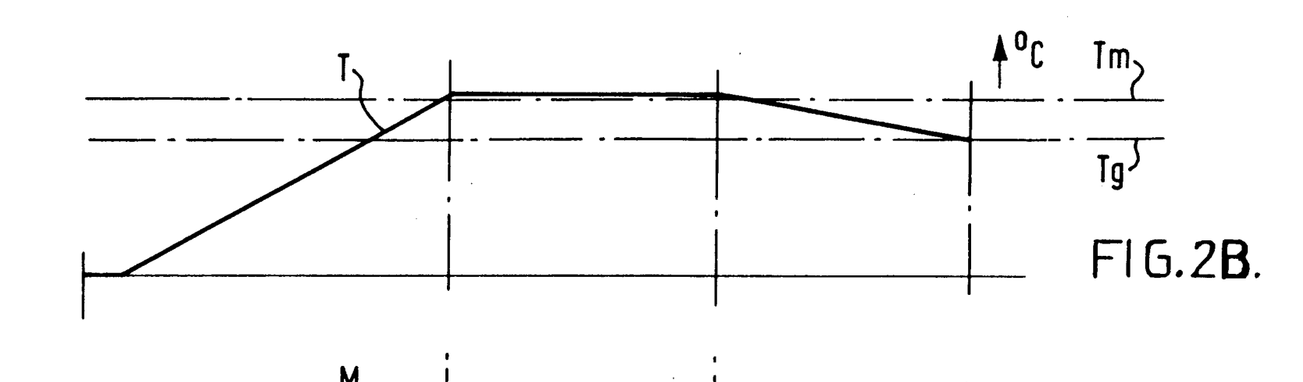
FIG. 2B illustrates the preferred temperature gradient thereacross in use, FIG. 3A diagramatically illustrates a modified form of the arrangement shown in FIG. 1.

FIG. 2A also shows the means enabling the stack of impregnated fibers reinforcement 18 to be differentially heated and cooled to give a preferred temperature gradient along the length of the tool substantially as shown in FIG. 2B.

In FIG. 2A the platens 12 and 14 are schematically shown to include suitable heating and cooling means 38 and 40 (e.g. ducts for heating and cooling liquids or gases, electrical heating cartridges) by means of which the platens are heated and cooled so that the temperature along the length of the tool varies and follows the curve T shown in FIG. 2B. As a result of this differential heating and cooling of the platens the temperature of the polymer impregnant in the stack is first raised to above its melt temperature (Tm) as it passes along the first part 351 of the length of the recess 34 in the tool, is then maintained at that temperature as it passes along the second part 352 of the length of the recess 34, and is finally cooled in a controlled manner to below the glass transition temperature (Tg) of the polymer being used as it passes along the third part 353 of the length of the recess 34. The particular temperatures maintained in the platens will depend upon both, the particular polymer (or mixture of polymers) used to impregnate the fibers reinforcement and the thickness of the laminate being produced.

When using, for example, polyethersulphone impregnated glass fibers the temperature of the stack will first rise as the stack passes along the first part 351 of the length of the recess 34 so that all of its thickness is at least at the melt temperature (Tm) of the polymer (typically 325° C.), the temperature of the whole thickness of the stack is maintained at least at that temperature as the stack passes along the second part 352 of the length of the recess 34 and in passing along the third and final part 353 of the length of the recess the temperature of the whole thickness of the stack fall in a controlled manner to below the glass transition temperature (typically 200° C.) of the polymer used until it exits the tool at a temperature of between 100° C. and 150° C.

The length of the platens (and in particular the length of the moving platen 12) is significantly greater than the width of the impregnated fibers reinforcement fed to the tool—typically the length of the operative part of the tool is at least three times the width of the impregnated fibers reinforcement fed to the tool. Thus for a laminate approximately 10" (25 cm) wide the preferred length of the platen 12 would be 30" (0.75 m).

The movement of the platen 12 is over a small distance and it therefore may be moved at a wide range of speeds ranging from relatively low speeds of, say, three or four strokes per minute to relatively high speeds of up to 300 strokes per minute depending upon the impregnated fibers reinforcement being processed.

The range of pressures applied to the impregnated fibers reinforcement in the tool is also dependent upon the impregnated fibers reinforcement being processed but it will be appreciated that, particularly with the relatively high speeds which can be used the pressures needed may be low (e.g. as low as 40 Kg/cm$^2$) compared with the pressures usually required to process high temperature thermoplastics materials whilst still obtaining a high quality finished laminate product.

The outer sheets 20 may be of any suitable ferrous or non-ferrous metal of any suitable thickness—e.g. aluminium foil of thickness 0.002"–0.010" (0.05–0.25 mm)—may be advantageously used.

It is believed that the described process and tool enable the production on a continuous basis of good quality, void free laminates from high temperature thermoplastics materials which are fibers reinforced by producing an enclosed volume or pocket in the stack as the stack passes through the tool—in particular as the stack passes along part 352 of the length of the recess 34 in the tool. This enclosed volume or pocket is defined by the edges of the outer sheets 20 (which are wrapped around the stack) and the side walls 341 of recess 34, the outer sheets 20 and the opposed operative faces 321 and 342 of the land 32 and recess 34, the volume of cooler and solid or semi-solid polymer of the stack being passed to the tool and in the part 351 of the the length of the recess 34, and the volume of cooling and semi-solid and solid polymer of formed laminate in part 352 of the length of the recess 34 and passing out of the tool. This enclosed pocket (in part 352 of the length of the recess 34) acts to seal the volume of the polymer of the stack which is at or above its melt temperature—temperature at which it may flow—preventing escape of the molten polymer and ensuring that on application of pressure by operation of the tool the polymer fully wets all the fibers reinforcement in the stack that is to say reaches, all parts of the fibers reinforcement. Again, the profiling of faces 321 and 342 enhances this effect.

If it is desired to produce metal coated laminates, in substance the same arrangement as that described above is used. However, the arrangement is modified in the following ways: the sheets 20 are of the metal with which it is desired to coat the laminate (when making printed circuit boards, copper, silver or gold foils of thicknesses of 0.002"–0.05 mm); the nozzles 24 either are omitted or are arranged to spray the sheets 20 with a solution of the thermoplastics material impregnating the fibers reinforcement; and the metal coated laminate drawn from the tool by the drive rollers 17 or a tractor to a position at which it is cut to desired lengths (rather than being wound on a take-up roller).

If a solution of the thermoplastics material impregnant is sprayed onto the outer sheets the solvent used is one which will be fully evaporated and driven-off at the operational temperature in the tool; e.g. if polyetherimide is being used a suitable solvent would be dichloroethane.

Figure 3A:
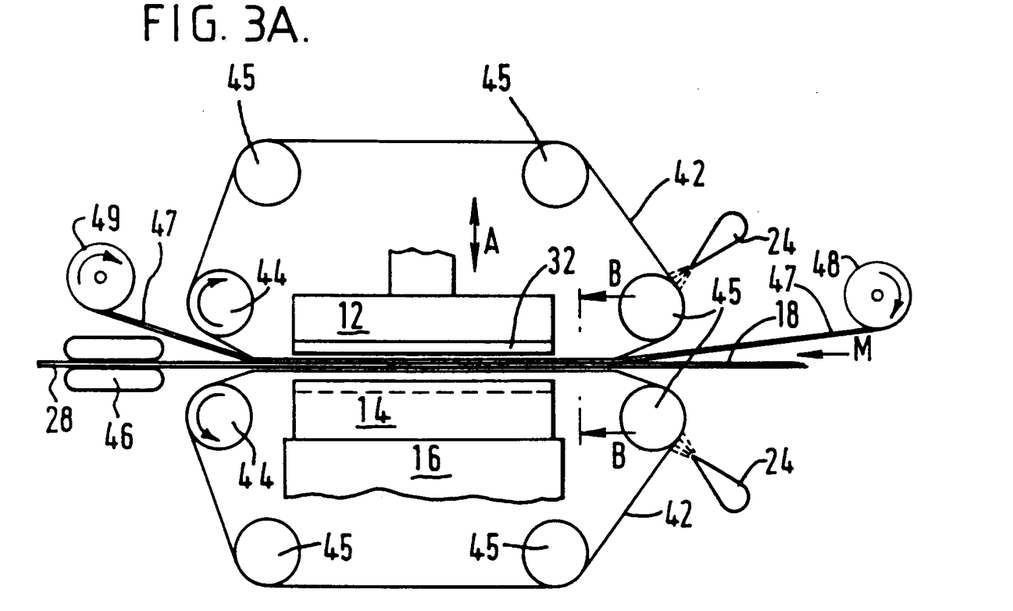
Figure 3B:
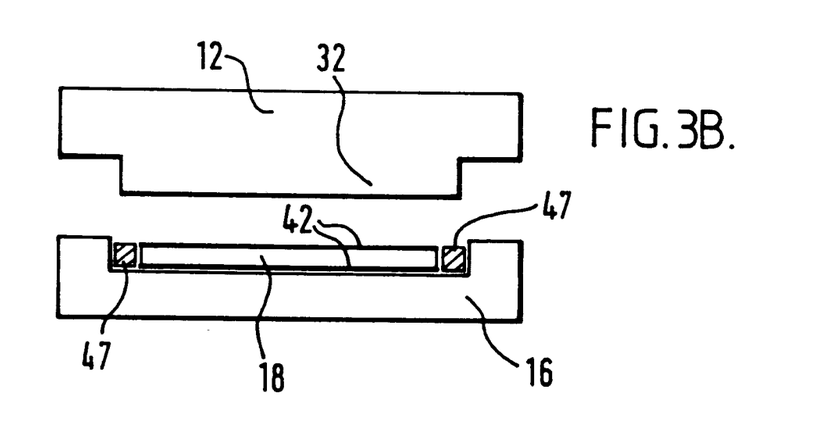
FIG. 3B is a sectional view on line B—B on FIG. 3A.

FIG. 3A illustrates a modified form of the tool shown in FIG. 1A and parts shown in it which are the same as parts shown in FIG. 1A are given the same reference numerals. In the arrangement of FIG. 3A, the platens 12 and 14 in particular are of the same form (that is to say are shaped and provided with heating and cooling means) as described with reference to FIG. 1A and will not further now be described.

The arrangement of FIG. 3A differs from that of FIG. 1A in that the outer sheets 20 have been replaced by two endless stainless steel bands 42 arranged to run round hydraulically driven rollers 44 and idler rollers 45 as shown. The width of each stainless steel band 42 is substantially the same as the width of the fibers reinforcement 18 and slightly less than the width of the recess 34 in the platen 14 to which the stack is passed. The drive rollers 17 have been replaced by a hydraulically driven tractor 46 which acts to drawn the formed laminate 28 through the tool and the bell mouth guide 37 is omitted.

The other significant difference between the arrangement of FIG. 3A and that of the FIG. 1A is that a pair of metal strips 47 are arranged to run from rollers 48, through the tool with the stack one lying to either side of the stack and occupying the space between the edges of and the sides of the recess 34 in the platen 14 and onto take up rollers 49. The metal strips 47 act to seal the side edges of the stack as it passes through the tool. The take up rollers are driven in synchronism, and preferably coupled to, the tractor 46.

The thickness of the metal strips 47 is selected in dependence upon the thickness of the laminate to be produced.

As with the arrangement already described the bands 42 are carried into and run through the tool in register with the impregnated fibers reinforcement and are stripped from the formed laminate 28 once they have passed through the tool. The metal strips 47 also pass through the tool with the fibers reinforcement 18 and the bands 42, and —as they occupy the volume between the edges of the stack and the recess 34—they act to seal the edges of the stack as it passes through the tool.

It will be appreciated that the arrangement shown in FIG. 3A has particular advantage in providing that the metal bands 42 which pass through the tool are not destroyed (cut) once they have passed through it and are re-usable.

The thickness of the stainless steel bands is selected in dependence upon the polymer and fibers reinforcement being processed and normally lies in the range 0.01"-0.02" (0.025-0.050 mm).

With the arrangement of FIG. 3A the chance of the thermoplastics impregnant sticking to the stainless steel bands is low as they are continuously being coated with a release agent (such as P.T.F.E.) from the nozzles 24; if it is thought necessary, however, means may be provided to continuously clean the bands of any polymer which could adhere to them. Such means may comprise, for example, a pair of blades or brushes arranged to contact and wipe the surfaces of the bands 42 in their run between the driven rollers 44 and the idler rollers 45.

Apparatus for driving the tool and other parts of the arrangement shown in FIGS. 1, 2 and 3 in the formation of a laminate (with or without a metal coating) will now be described with reference to FIG. 4 which illustrates, highly diagramatically, a typical electro-hydraulic drive system for the arrangement.

The drive system includes a reservoir 50 for hydraulic fluid from which the hydraulic fluid is passed by a pump 52 to a mechanical two way valve 54. In one position (the position shown) of the valve 54 the hydraulic fluid is passed to a valve 56 driven between two end positions by operation of two solenoids 58 and 60. Operation of the solenoids is effected by a controller 100. When solenoid 58 is operated to move valve 56 to its rightmost position (as viewed in the Figure) the pressurised hydraulic fluid drives a piston 62 in cylinder 64 to carry the moving platen 66 toward the other, fixed, platen (not shown). A pressure sensor 68 is arranged to output to an electrical controller 100 a signal indicating when a desired (pre-set) pressure in the hydraulic system has been reached and platen 66 is applying the desired pressure to the impregnated fibers reinforcement in the tool. Controller 100 is arranged to then operate the solenoid 60 to move the valve 56 to its leftmost position (as viewed in the Figure) releasing the pressure on piston 62 and allowing the moving platen 66 to be moved away from the fixed platen.

The controller 100 may be arranged to effect this release of pressure applied to the piston 62 immediately the pre-set pressure has been reached or after maintaining the pressure for a pre-set time period during which time the valve 56 is moved by solenoid 60 from its rightmost position to a central position—that shown in the Figure—for the duration of the delay and then moved to its leftmost position.

Figure 4:
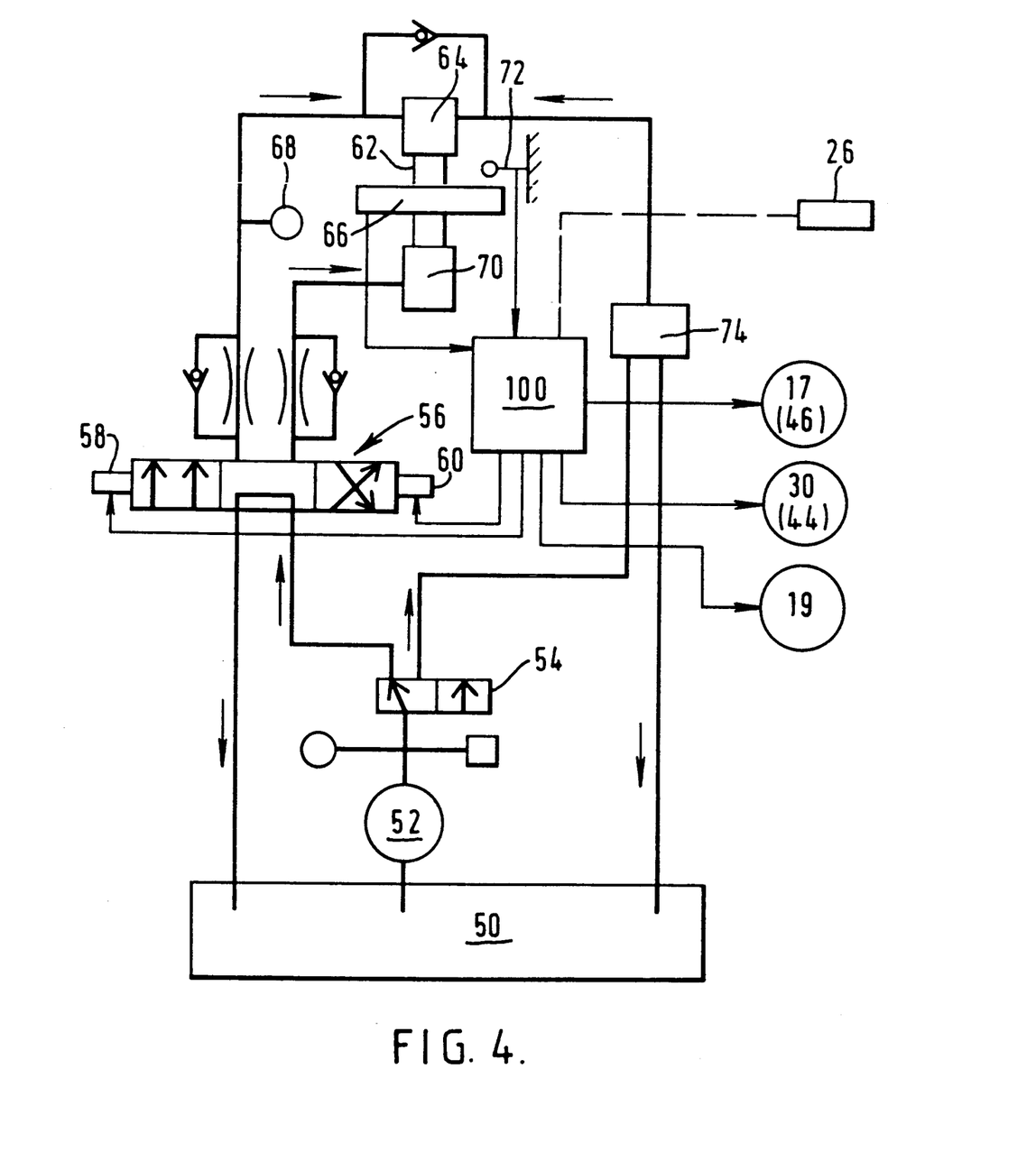
FIG. 4 schematically illustrates an electro-hydraulic drive system for the arrangements of FIG. 1 or, FIG. 2.

In the particular arrangement shown in the FIG. 4 the movement of the valve 56 to its leftmost position acts to couple the pressurised hydraulic fluid to a second piston 70 arranged to drive platen 66 away from the fixed platen. When platen 66 has moved sufficient distance away from the fixed platen a limit switch 72 is tripped, which signals to controller 100 that the platen 66 has moved the desired distance. The controller 100 then operates solenoid 60 to drive the valve 56 from its rightmost position and release the pressure on piston 70 and so stop further movement of platen 66. Controller 100 then causes the take-up rollers 18 and 30 (or driven roller 44 and tractor 46) to move by a small amount such that the outer sheets and impregnated fibers reinforcement is advanced through the tool by a preset desired amount. Thereafter solenoid 58 is energized to restart the noted cycle of operations once again.

Controller 100 may also be arranged to control operation of the cutters 26 (if they are provided).

When valve 54 is in the position other than that shown (i.e. manually moved leftwardly a viewed in the Figure from the position shown) pressurised hydraulic fluid may be applied to the tool 10 via a manually operable valve 74 to cause the tool to operate in the usual fashion.

As already noted movement of the moving platen is over a small distance and it may be moved at relatively high speeds enabling relatively low pressures to be used—e.g. in the range of 0.5 to 2 Tons p.s.i. (40–120 Kg/cm$^2$) whilst still obtaining a high quality finished laminate product.

With the method described laminates of good structural integrity and high quality surface finishes are obtained.

It is thought that the high quality of the laminates produced by this example of the invention is achieved for the reasons advanced above—specifically by the formation of an enclosed volume in which the molten polymer is processed. The sheets 20 (or bands 42) which are used to cover the upper and lower surfaces of the impregnated fibers reinforcement seal those surfaces of the stack as it passes through the tool, the folding of the sheets 20 or the positioning of the strips 47 act to seal the side edges of the impregnated fibers reinforcement as it is carried through the tool, and the volumes of solid or semi-solid polymer both before and after the volume of molten polymer in the stack act to seal the volume of molten polymer in the tool.

The production of high quality laminates is further enhanced by the provision of the sheets 20 as these sheets act to to contain the loading of the platens on the impregnated fibers reinforcement, and to transmit heat from the tool to the impregnated fibers reinforcement more effectively than has until now been the case.

It will be appreciated that in the described arrangements for making un-coated laminates it is provided that the impregnated fibers reinforcement contact outer sheets (or stainless steel bands) so that the tool surfaces do not come into contact with the polymer impregnant and cannot therefore become fouled by that polymer.

Again, the particular arrangements described increase the level of positive guidance given to the stack as it passes through the tool—the walls of the recess acting to prevent misalignment of the fibers reinforcement as it passes through the tool.

The embodiments further provide that the outer sheets (or bands) may be coated with a release agent as they are passed to the tool so that the metal surfaces contacting the impregnated fibers reinforcement will not lift polymer from the fibers reinforcement reducing the visual or strength characteristics of the laminate as it is made.

It will be appreciated that the sheets 20 (and bands 42), although specifically described as being of metal, need not be of metal and that other materials which are relatively strong and have good thermal conductivity could be used. It is envisaged that such other sheets might be of silicone rubber, or cloth impregnated with P.T.F.E or silicone rubber. If appropriate alternative materials are used the need to coat the sheets with a release agent before passing them to the tool will be reduced.

It is envisaged that in certain circumstances the tapering of the side walls 341 of the recess 34 may be sufficient to achieve the desired level of enclosure of the fibers reinforced high temperature thermoplastics layers between the outer layers 20 and the former-guide may in those circumstances be omitted.

It will further be seen that the arrangement described with reference to FIG. 4 is merely one way of ensuring that the arrangements described with reference to FIGS. 1 and 2 are operated in accordance with the method of the invention. The specific method of driving the movable platen (i.e. using two pistons to drive it) may be modified; e.g. a single, reciprocating piston may be used to drive the movable piston both toward and away from the fixed platen. It is envisaged that each of the platens could be movable, and that any suitable (e.g. electro-mechanical, pneumatic) method of driving the tool may be used.

It is possible to make more complex shaped laminates with the method of the invention either by reheating and post forming flat laminates made in accordance with the methods described above or by feeding the sandwiched impregnated fibers reinforcement to pairs of shaped platens directly forming impregnated fibers reinforcement laminates of any desired shape.

Other more complex shapes may also be made by processes making use of the method of the invention e.g. impregnated fibers reinforcement "wrapped" in the outer sheets may be wound on a mandrel or other former to provide a helically wound reinforced precursor which is then passed to the arrangement described above.

The arrangements described above may be used in combination with one another and with other standard laminate production techniques (e.g. to produce a laminate coated on one side only with a metal layer) without departing from the invention.

I claim:

1. A method of making continuous lengths of thermoplastics material fibers reinforced laminates, comprising the steps of placing at least one layer of fibers reinforcement impregnated with a thermoplastics material between outer sheets of another material to form a stack, passing the stack through a tool having platens at least one of which is movable relative to the other, and operating the tool to compress the stack and form a laminate, wherein in said passing step the stack is moved from an entrance to an exit of the tool in increments which are substantially less than the length of the tool defined between the entrance and the exit thereof such that each area of the stack is subjected to repeated compressions by the tool in passing of the stack therethrough, and wherein in said step of passing through the tool the stack is moved along a recess formed in one of said platens, which recess is shaped to receive a land formed on another of said platens and the width of which is substantially the same as the width of the stack as the stack passes through the tool, and wherein at least one of said platens of the tool is differentially heated and cooled such that the temperature of the thermoplastics material impregnating the layer of fibers reinforcement of the stack in said passing step through the tool is first raised to at least a melt temperature of said thermoplastics material and then is allowed to fall below said melt temperature, and wherein a face of said at least one platen is profiled such that a spacing between opposed faces of said platens decreases along at least a part of the length of the recess through which the stack is moved from the entrance to the exit of the tool.

2. A method as claimed in claim 1, wherein said thermoplastics material is selected from the group consisting of polysulphone, polyethersulphone, polyetheretherketone, polyimide and polyetherimide.

3. A method as claimed in claim 1, wherein said outer sheets are wider than said at least one layer of fibers reinforcement placed therebetween and wherein leading parts of side walls of the recess at the entrance to the tool to which the stack is passed are tapered such that said outer sheets are wrapped around edges of said at least one layer as the stack passes into the tool.

4. A method as claimed in claim 2, wherein said outer sheets are wider than said at least one layer of fibers reinforcement placed therebetween and wherein leading parts of side walls of the recess at the entry to the tool to which the stack is passed are tapered such that said outer sheets are wrapped around edges of said at least one layer as the stack passes into the tool.

5. A method as claimed in claim 1, wherein a plurality of said layers of fibers reinforcement impregnated with a thermoplastics material are arranged between said outer sheets.

6. A method as claimed in claim 1, wherein said two platens of the tool are differentially heated and cooled.

7. A method as claimed in claim 1, wherein said two platens of the tool are differentially heated.

8. A method as claimed in claim 1, wherein said two platens are differentially cooled.

9. A method as claimed in claim 1, wherein said opposed faces of said two platens are profiled such that the spacing between said platens decreases along at least a part of the length of the recess through which the stack travels from the entry to the exit of the tool.

10. A method as claimed inn claim 3, wherein the stack of impregnated fibers reinforcement and said outer sheets is passed to the tool between a pair of metal strips arranged to taper toward the entry of the tool and, each strip of said pair being aligned with a respective one of the leading part of the side walls of the recess at the entry to the tool.

11. A method as claimed in claim 3, wherein the opposed faces of said platens between which the stack is compressed in passing through the tool are profiled such that the spacing therebetween decreases at a first rate along at a first part of the length of the recess, at a second rate less than said first rate along at a second part of the length of the recess, and is substantially constant along a third part of the length of the recess.

12. A method as claimed in claim 11, wherein both platens are heated and cooled such that the temperature of the thermoplastics material impregnating the fibers reinforcement of the stack in passing through the tool is raised to at least the melt temperature thereof as the stack passes along the first part of the length of the recess, is maintained at said temperature as the stack passes along the second part of the length of the recess, and is allowed to fall below a glass transition temperature of said thermoplastics material as the stack passes along the third part of the length of the recess.

13. A method as claimed in claim 12, wherein the stack of impregnated fibers reinforcement and said outer sheets is passed to the tool between a pair of metal strips arranged in abutting relationship on each side edge of the stack.

14. A method as claimed in claim 12, wherein the outer sheets are of metal.

15. A method as claimed in claim 12, wherein the outer sheets are removed from the laminate after passing through the tool.

16. A method as claimed in claim 13, wherein the outer sheets comprise endless bands arranged to run through the tool in register with the impregnated fiber reinforcement.

17. A method as claimed in claim 16, wherein the endless bands are of stainless steel.

18. A method as claimed in claim 13, wherein the surfaces of the outer sheets which contact the impregnated fibers reinforcement are coated with a release agent before they are brought into contact with the impregnated fibers reinforcement.

19. A method as claimed in claim 12, wherein the outer sheets are bonded to and form part of the laminate as the laminate is formed in the tool.

20. A method as claimed in claim 14, wherein the surfaces of the outer sheets which contact the impregnated fibers reinforcement are coated with a solution of a polymer impregnant for the fibers reinforcement before they are brought into contact with the impregnated fibers reinforcement.

21. Apparatus for making continuous lengths of laminates from fibers in a matrix of a thermoplastic material, the apparatus comprising means for placing at least one layer of fibers reinforcement impregnated with a thermoplastics material between outer sheets of another material to form a stack, means for passing the stack stepwise through a tool having a first platen which is stationary and a second platen movable relative to the first platen, said tool being operable to repeatedly compress the stack and form a laminate as the stack is moved stepwise through the tool, said second platen of the tool being formed with a recess the width of which is substantially the same as the width of the stack as the stack passes through the tool, said recess being shaped so as to receive a land formed on said first platen, wherein leading edges of the recess at the entrance of the tool to which the stack is passed are tapered such that said outer sheets are wrapped around edges of said at least one layer as the stack passes into the tool, and wherein opposed faces of said land of the first platen and the recess of the second platen are profiled such that a spacing therebetween decreases at a first rate along at a first part of the length of the recess, at a second rate less than said first rate along at a second part of the length of the recess, and is substantially constant along a third part of the length of the recess, and wherein said first and second platens each includes means enabling each platen to be heated and cooled so that the temperature of said thermoplastics material impregnating the fibers reinforcement is raised to at least a melt temperature thereof as the stack passes along the first part of the length of the recess, is maintained at said temperature as the stack passes along the second part of the length of the recess, and is allowed to fall below a glass transition temperature of said thermoplastics material as the stack passes along the third part of the length of the recess.

* * * * *